(12) United States Patent
Boulton (10) Patent No.: US 8,854,260 B2
(45) Date of Patent: Oct. 7, 2014

(54) OVER THE AIR GNSS TESTING USING MULTI-CHANNEL GENERATORS TO CREATE SPATIALLY DISPERSED SIGNALS

(71) Applicant: Spirent Communications, Inc., Sunnyvale, CA (US)

(72) Inventor: Peter Boulton, Paignton (GB)

(73) Assignee: Spirent Communications, Inc., Sunnyvale, CA (US)

( * ) Notice: Subject to any disclaimer, the term of this patent is extended or adjusted under 35 U.S.C. 154(b) by 0 days.

(21) Appl. No.: 13/898,240

(22) Filed: May 20, 2013

(65) Prior Publication Data
US 2014/0225774 A1  Aug. 14, 2014

Related U.S. Application Data

(63) Continuation-in-part of application No. 13/766,618, filed on Feb. 13, 2013.

(51) Int. Cl.
*G01S 19/23*  (2010.01)
*G01S 7/40*  (2006.01)
(52) U.S. Cl.
CPC .................................... *G01S 19/23* (2013.01)
USPC ..................... 342/357.62; 342/169
(58) Field of Classification Search
USPC ............ 342/169, 174, 357.4, 357.46, 357.62; 702/89, 182, 188
See application file for complete search history.

(56) References Cited

U.S. PATENT DOCUMENTS

| | | | |
|---|---|---|---|
| 6,031,486 A * | 2/2000 | Anderson et al. | 342/165 |
| 7,797,132 B1 * | 9/2010 | Lele et al. | 702/182 |
| 2008/0316087 A1 * | 12/2008 | Stoufer et al. | 342/169 |
| 2013/0271317 A1 * | 10/2013 | Goel et al. | 342/357.62 |

FOREIGN PATENT DOCUMENTS

WO  2013/154973  10/2013

OTHER PUBLICATIONS

Great Britain Search Report for application No. GB1402479.8. May 23, 2014. 6 pages.

* cited by examiner

*Primary Examiner* — Dao Phan
(74) *Attorney, Agent, or Firm* — Haynes Beffel & Wolfeld LLP; Ernest J. Beffel, Jr.

(57) ABSTRACT

The problem of simulating movement of multiple GNSS or regional navigational satellite system satellites across the sky within a test environment is solved by the technology disclosed using a test chamber with a plurality of zones bounded by azimuth and elevation limits, positioning at least one directional antenna in each zone, driving each antenna individually with a GNSS simulator capable of producing multiple positioning signals for a plurality of satellite sources in a single zone, and coordinating among GNSS simulators a simulated orbital movement of the satellite sources from one zone to an adjoining zone to produce changing angles of arrival for the positioning signals during a test. Both methods and systems implement this technology.

22 Claims, 5 Drawing Sheets

FIG 9

OVER THE AIR GNSS TESTING USING MULTI-CHANNEL GENERATORS TO CREATE SPATIALLY DISPERSED SIGNALS

RELATED APPLICATION

This application is a continuation-in-part of U.S. patent application Ser. No. 13/766,618, entitled, "Over the Air GNSS Testing Using Multi-Channel Generators to Create Spatially Dispersed Signals," filed on 13 Feb. 2013. This related and priority application is hereby incorporated by reference for all purposes.

BACKGROUND

The technology disclosed relates to testing position locating components of devices. In particular, it relates to provision of simulated signals from one or more constellations of positioning satellites over the air such that the angles of arrival are consistent with the relative movement of the satellites through the sky during a test scenario.

Mobile communication devices such as smart phones and tablet computers and other mobile devices with radio connectivity frequently include a location determination function based on satellite radio navigation systems such as GPS, GLONASS and others using similar principles.

Testing of such devices can be done using actual Radio Frequency (RF) satellite signals and suitable antennas, but is predominantly performed using simulators or emulators that are able to generate the relevant satellite signals synthetically and coherently. Such devices under test observe signal timing and dynamics that are consistent with a simulated location, date, time and the satellite motion from a representative satellite constellation, with all aspects being defined by the operator of the test. The signals contain characteristics of real satellite signals including transmission delay, Doppler shift, modulation envelope and digital coding.

In most cases, the connection to the device under test is made using a coaxial RF cable which bypasses antennas on the device. As there is no RF antenna involved, accounting for the effects of the antenna itself involves modifying the signals using a model of the antennas' reception characteristics based on arrival vector of the signal-in-space.

An opportunity arises to improve device testing. Better, more easily configured and controlled, more resilient and transparent components and systems may result.

SUMMARY

The problem of simulating movement of multiple GNSS or regional navigational satellite system satellites across the sky within a test environment is solved by the technology disclosed using a test chamber with a plurality of zones bounded by azimuth and elevation limits, positioning at least one directional antenna in each zone, driving each antenna individually with a GNSS simulator capable of producing multiple positioning signals for a plurality of satellite sources in a single zone, and coordinating among GNSS simulators a simulated orbital movement of the satellite sources from one zone to an adjoining zone to produce changing angles of arrival for the positioning signals during a test. Both methods and systems implement this technology. Particular aspects of the technology disclosed are described in the claims, specification and drawings.

DETAILED DESCRIPTION

The following detailed description is made with reference to the figures. Preferred embodiments are described to illustrate the technology disclosed, not to limit its scope, which is defined by the claims. Those of ordinary skill in the art will recognize a variety of equivalent variations on the description that follows.

For some testing of positional locating components of a device, especially where the antenna is an integral part of the finished device, Over-The-Air (OTA) testing and evaluation is required. In such a case, where the global navigation satellite system (GNSS) signals are transmitted from an antenna or antennas to the device, usually within some form of screened chamber that prevents interference from actual satellite signals, prevents transmitted signals interfering with other devices in the vicinity, and is able to suppress signal reflections from the chamber walls by being lined with a suitable radio-absorptive material.

To improve the flexibility of a fixed antenna array mounted in the screened chamber and driven by individual satellite signals, it has been suggested that the antenna elements could be mounted on motorized mounts attached to curved rails that represent the satellite trajectory across the sky such that movement along the rails would be consistent with the simulated arrival angle. The inventors are not aware of any implementation or public disclosure of this suggestion. The rails that might be implemented can be envisaged from FIG. 1, which depicts movement of multiple satellites in a pair of constellations. Over a longer period of time, satellite paths intersect in many places as the satellites traverse from horizon to horizon, from satellite rise to satellite set.

There are a number of significant engineering challenges with such an approach. Imagine a typical scenario conducted at medium latitudes with both GPS and GLONASS constellations. The following is a non-exhaustive list of some of the issues to be addressed:

Up to 24 rails may be needed to represent the trajectory (2 constellations, 12 satellites each in view).

The rails would need to be elevated to almost any elevation angle from 0 to 90 degrees depending upon the azimuth at the point where the satellite rises and sets.

The rails would need to be rotated in azimuth by up to 180 degrees depending upon the azimuth at the point where the satellite rises and sets.

The rails would cross over at multiple points causing antenna to be occluded by both the rails and antennas moving along rails.

The rails would need to be at different distances from the test item to prevent antenna collisions.

The speed at which antennas move would be variable

The rails would have to be of differing length to deal with satellites that are visible from between a few minutes to in excess of 8 hours.

RF cabling to the antennas must be flexible and of significant length. There is significant potential for tangled cables.

The rails and antenna mounts could introduce unwanted reflections which can't be mitigated by absorptive materials which must of necessity lie outside the rails.

For these and other reasons, a better solution would be useful.

An alternative possibility would be to replacing the rails and one-antenna-per-satellite with signal switching among a much larger array of transmit antennas distributed around the chamber. The signals to be generated for any particular satellite would be allocated to an appropriate antenna in the array with a complex RF switch matrix would make the relevant dynamically changing connection between source and antenna. The RF switch matrix would require combinations of numerous high-performance switches and combiners and numerous RF cables. Such an installation would be a significant undertaking

PROBLEM/SOLUTION/ADVANTAGES

Figure 2:
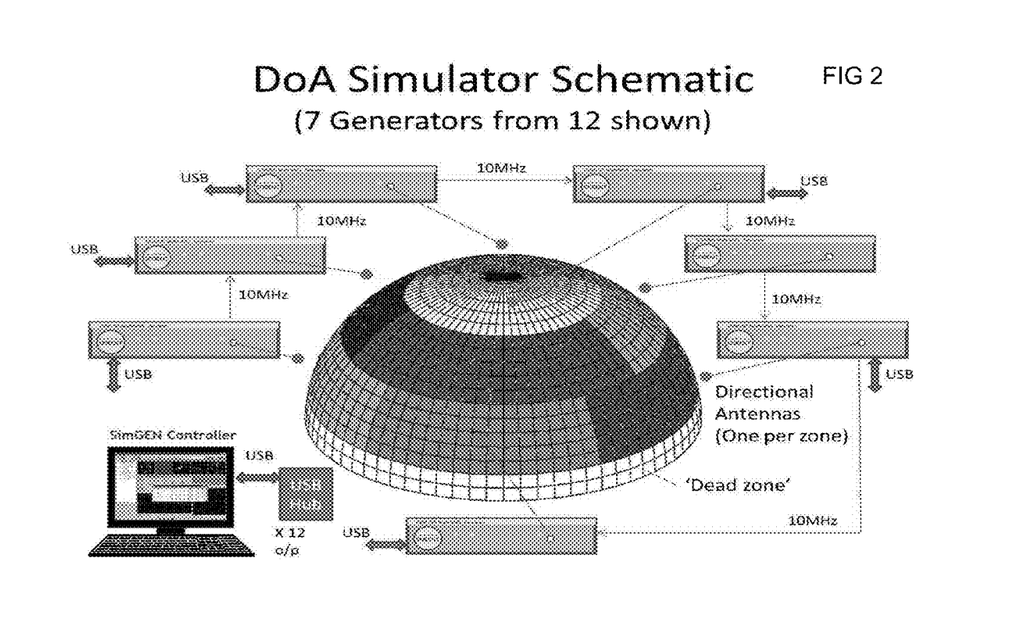
FIG. 2 is a schematic for an example of a test chamber, GNSS generator and controller configuration.

The problem of simulating movement of multiple GNSS or regional navigational satellite system satellites across the sky within a test environment is solved by the technology disclosed using a test chamber with a plurality of zones bounded by azimuth and elevation limits, positioning at least one directional antenna in each zone, driving each antenna individually with a GNSS simulator capable of producing multiple positioning signals for a plurality of satellite sources in a single zone, and coordinating among GNSS simulators a simulated orbital movement of the satellite sources from one zone to an adjoining zone to produce changing angles of arrival for the positioning signals during a test. FIG. 2 illustrates mapping zones over a hemi-spherical chamber and linking antennas in the zones to GNSS simulators.

Antennas used in such a chamber can be polarized. A variety of polarization configurations can be used, such as cross-polarized pairs, vertical (V) and horizontal (H) polarizations, V and V polarizations, right hand circular polarization, left hand circular polarization, and others. More generally, a single element V antenna, or H antenna, or a circular polarized antenna could be used. As another example a switch could be used that would select a V or H or other type of antenna (so that there is only one input if a switch is used) for each antenna location. If these antennas are connected to two different outputs from a fading channel emulator or other signal generator, they could be operated simultaneously. Two antennas could be operated to generate a circular polarized signal. Or using a switch they could be operated one at a time. Antennas placed in low elevation zones or at cardinal points of the chamber (4 corners) could be configured to introduce the reversed polarizations. The system could maintain coherency between reversed polarization zones, despite polarization reversal.

Throughout this discussion, the term GNSS, which is short for global navigation satellite system, should be considered to include regional constellations such as Japan's QZSS and India' IRNSS, because the technology disclosed applies to simulating both global and regional satellite constellations. Orbits used for global and regional systems can be taken into account with the technology disclosed.

Figure 5:
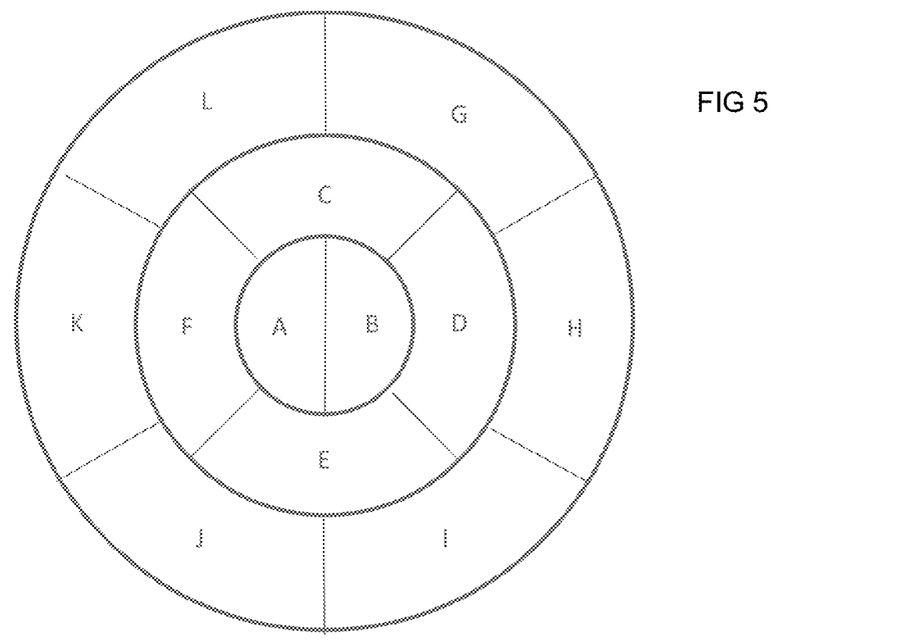
FIGS. 5-7 illustrate examples of zone layouts.
Figure 6:
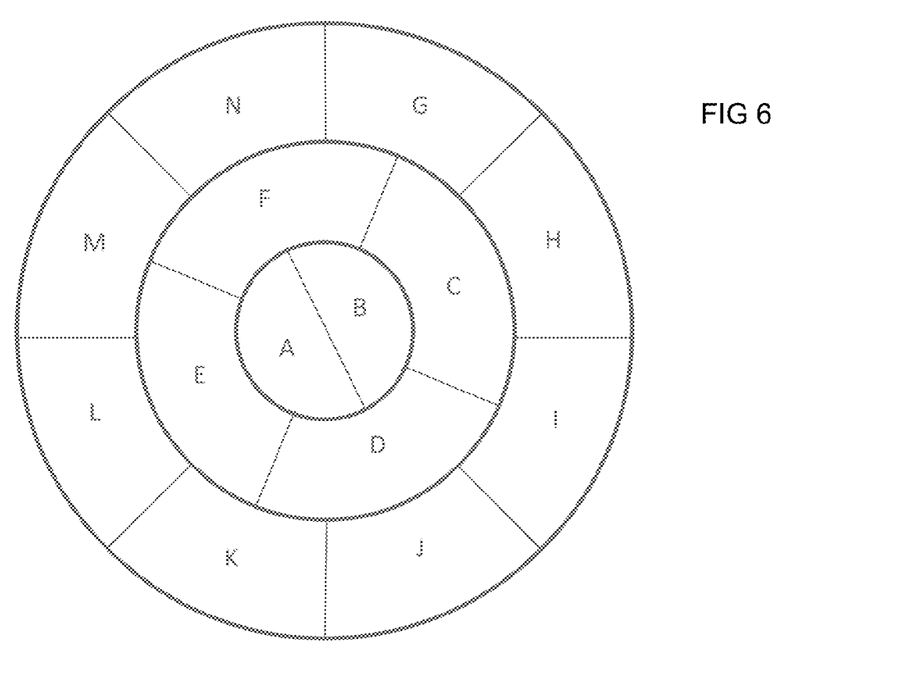
Figure 7:
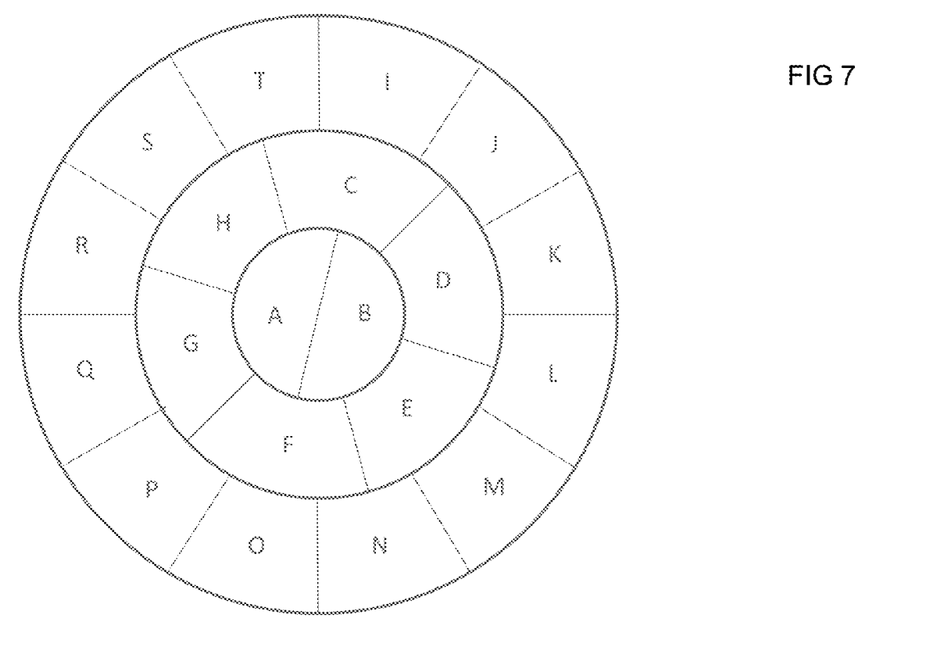

This solution may involve using a dozen zones covering elevations beginning about 5 or 10 degrees above a horizon, or in that range. Antennas in a dozen zones would be driven by a dozen GNSS simulators that are coordinated in operation by a test controller. If the GNSS simulators were capable of multiple outputs without cross-talk, the number of simulators could be reduced. In various implementations, more or fewer GNSS simulators can be used than zones controlled, depending on the signal generation capabilities of individual simulator hardware components and the requirements of the test. More or fewer zones might be used, such as 14 or 16 zones. Example sky zone maps for 12, 14 and 20 zones are illustrated in FIGS. 5-7. More zones can be used, as described below and apparent to those skilled in the art. The GNSS simulators may be Spirent GSS6700 Multi-GNSS, Multi-channel Simulator units, which may be coordinated by a specially programmed SimGEN controller. One or more reference timing signals may be propagated among the GNSS simulators, such as a 10 MHz reference signal with a one pulse per second timing reference. A USB, Ethernet or other interface can be used by the controller to control generation of the positioning signals by the GNSS simulators.

A more general problem of testing multiple sources of location information can be solved by combining the simulated GNSS satellite test environment with WiFi and/or cellular network augmentation simulation, which may be supplied either over the air or by a wired lead to the device under test.

This technology introduces a new, fully-scalable approach to the OTA problem of presenting a meaningful angle of arrival for multiple signals using a shielded chamber. Instead of trying to exactly match the angle of arrival from an orbiting satellite to a DUT, the system divides the simulated sky into zones. Enough zones are chosen to test a variety of angles of arrival and a variety of orbital paths.

The technology disclosed avoids the need for long RF cable runs, RF switch matrices and/or complex physical construction. A long running test scenario can be played out, as the number of zones chosen supports a wide range of orbital conditions. Multi-constellation support that does not require additional antennas. A flexible architecture reduces the need for antenna relocation to replicate real world scenarios.

System Description

FIG. 2 illustrates logically and physically splitting satellite arrival vectors, as would be perceived by a device under test, into adjacent zones bounded by upper and lower azimuth and elevation angle limits. The number of zones would be scalable. In FIGS. 2 and 5, a dozen zones are illustrated. In FIG. 6, two additional zones are added close to the horizon. This may be useful for simulating use of receivers at northern and southern latitudes away from the equator.

For the zones, the test chamber set-up provides and allocates multi-satellite GNSS simulators and transmission antennas. These simulators and antennas generate satellite signals for signals that fall within zones defined by vector angle bounds. Increasing the number of zones increases the number of generators, and having more generators/zones improves the angular resolution. Around 12, 16, 20, 24 or 32 zones should be useful for many applications.

As a satellite arrival vector changes with time, it will move from zone to zone. One generator will stop generating the signal for a given satellite at the same time that another starts generating the signal for the given satellite, providing a virtual switch of the signal from one antenna to another without an RF switch. Alternatively, signal generation may fade from one zone to another over a predetermined time, such as 10, 50, 100, 200, 400 or 1000 ms. Various satellites within a zone will move to other zones at different times and rates and in different directions. The switchover will take place automatically at the appropriate zone boundary at the appropriate time. Hand-off from one zone to the next can exhibit some short discontinuity, as GPS circuits in hand held devices are designed to tolerate discontinuities. Even more sensitive location units that detect discontinuities in carrier phase and treat them as cycle slips could be accommodated by careful calibration. Testing carrier phase sensitive devices could warrant an increased number of zones to 24 or 32 zones, or anywhere in that range. It also might require more zones than 32. Measurements adapted to testing carrier phase-based reference receivers are not typically required for testing consumer mobile devices.

Zones limits can be user programmable and may be broadly consistent with each transmit antenna location within the chamber, which would typically be centered on each zone. Zones could be evenly distributed within bands of elevation. Alternatively, if an asymmetrical scenario were being run, such as replicating the presence of a large building or row of buildings that would prevent reception of signals from one direction or that would reflect signals and cause multipathing, a non-uniform distribution might be used. In many scenarios, presence of an obstruction can be modeled by simply suppressing or attenuating signals from that direction.

More generally, multipathing can be simulated by the control software. In multipath scenarios, the same satellite signal comes from different directions. The reflected signal arrives with lower power after traversing a longer path length. Such a scenario would involve both LOS and multipathed signals. A model can be used to specify the multipath components of a signal. In some implementations, a table can be used to relate direction of arrival to multipath components of a signal, based on its angle of arrival. Based on azimuth and elevation, the multipath environment can be specified in a table. The resolution of the table can be greater than the number of zones, to increase the variety of multipathing that is simulated, beyond the variety of angles of arrival.

As the generators are equipped with multiple satellite channels for each constellation, the excess channels not being used for simulation of the line-of-sight satellites for that zone may be dynamically employed to generate reflected signals emanating from other zones. This represents challenging signal environments including urban canyons with roads or sidewalks lined by tall buildings in dense urban areas and occluded scenarios such as indoor or shaded locations.

Figure 8:
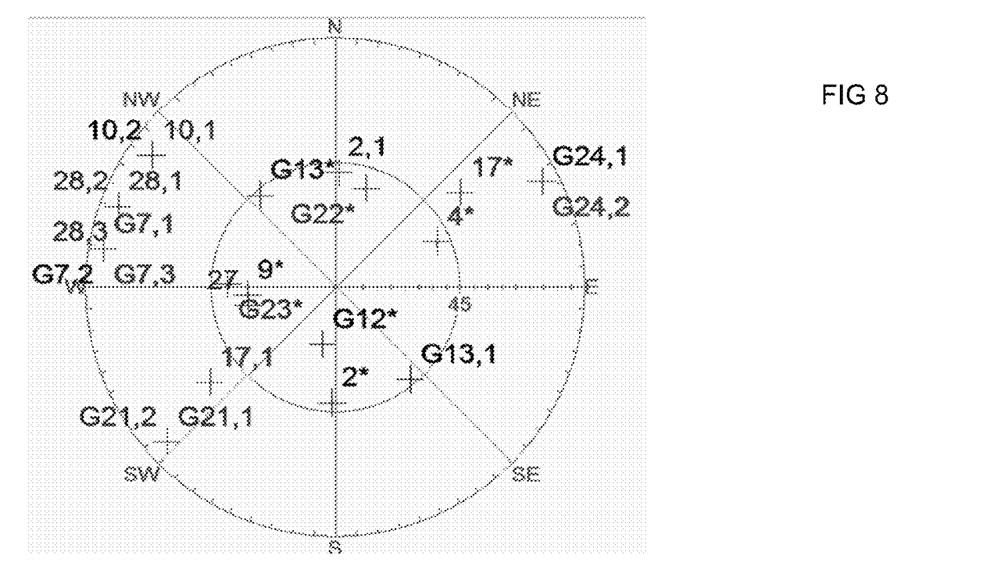
FIG. 8 illustrates an example of GNSS satellite positions with multipaths using an environment mask.
Figure 9:
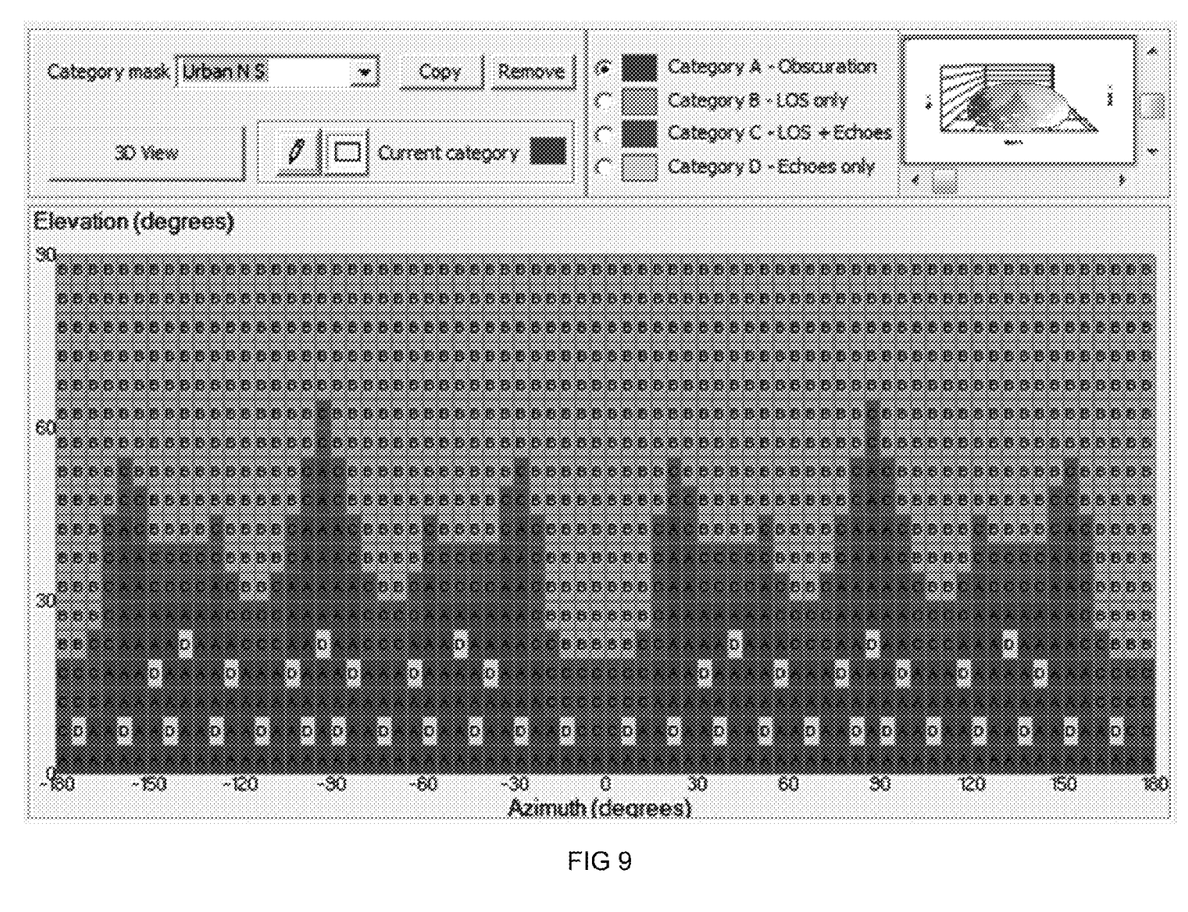
FIG. 9 illustrates an example of table specification of a multipath environment.

FIG. 8 indicates phantom satellite positions corresponding to multipathing. For instance, 28,2 and 28,3 are phantom positions at different positions than the actual satellite. FIG. 9 shows a screen shot of one implementation of a multipath model that defines what happens to signals arriving from particular directions. In FIG. 9, the signals can be: (A) blocked entirely; (B) let through without additional multipath but with some level fading; (C) let through with some level fading but also generate a modeled multipath from another direction; or (D) blocked but generating a modeled multipath from another direction. Differing treatments of signals correspond to conditions A, B, C or D in the figure. In this implementation, the user can define the pattern mask and also select different masks at different times to represent changing conditions, such as reaching intersections or travelling under bridges, etc. The user can also assign different severities of multipath (delay and loss) at different elevation angles in the associated model (not shown).

This exiting model can be further extended to allocate the multipaths to different transmitters and also add an element that periodically moves the multipath from the allocated zone to adjacent zones in a manner that models the changing vector of typical multipath reflections. In addition to multipathing, signal generators can be used to induce interference.

Interference of many types can be included in a simulation scenario. A wide range of interference conditions can be simulated using commercially available hardware such as be Spirent GSS6700 Multi-GNSS, Multi-channel Simulator units and associated control and feature extension software.

The associated software can also optionally exclude a complete elevation range up to a user-programmable limit, such as excluding 0 to 5 degrees or 0 to 10 degrees above the horizon. This may reasonably test devices, since many devices exclude such low elevation signals due to their propensity to exhibit strong multipath components affecting location accuracy. Excluding low elevations near the horizon would improve the resolution of the zones by reducing the coverage per antenna.

In a system that uses 12 zones, half of the zones may for example be in a ring at the lowest elevation of the sky. The path traced by a satellite will depend on latitude and, at least for regional systems, also may depend on longitude. At the equator, satellites are sometimes directly overhead and appear to rise very quickly and then hang overhead a long while, completing the transit in about six hours. Because the angular change overhead is slow, one may not need many zones directly overhead. However, at lower elevations, one may need more zones. Accordingly, when using six zones, for example, three may be at the lowest elevation, two at the next, and one at the top. With 12 zones, six may be at the bottom, four in the middle and two at the top, as depicted in FIG. 6. More zones at the lowest elevations are useful to simulate satellites that barely rise above the horizon and are visible for only an hour or so. They are also useful for the simulation of multipaths from low elevation satellites.

Figure 1:
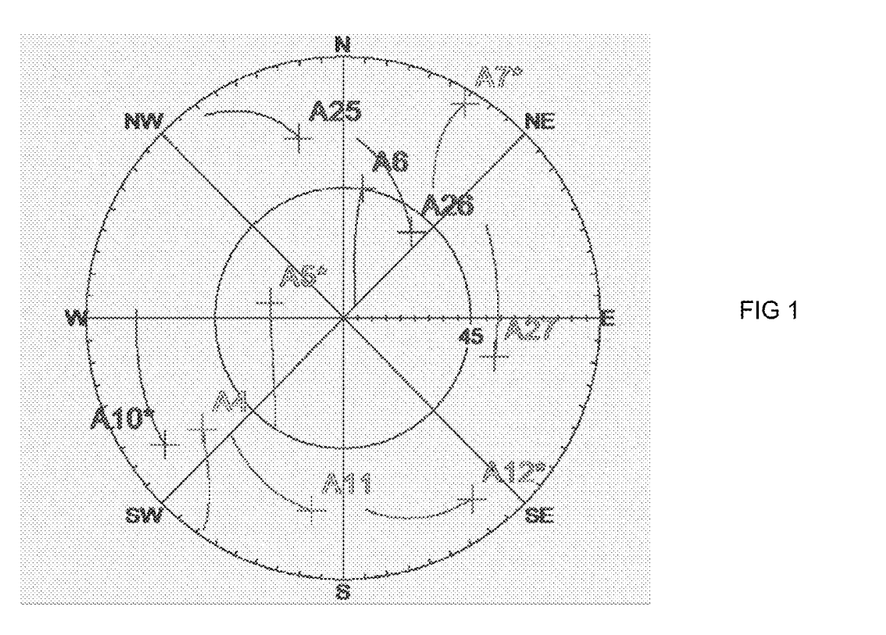
FIG. 1 illustrates an example of GNSS satellite tracks.
Figure 3:
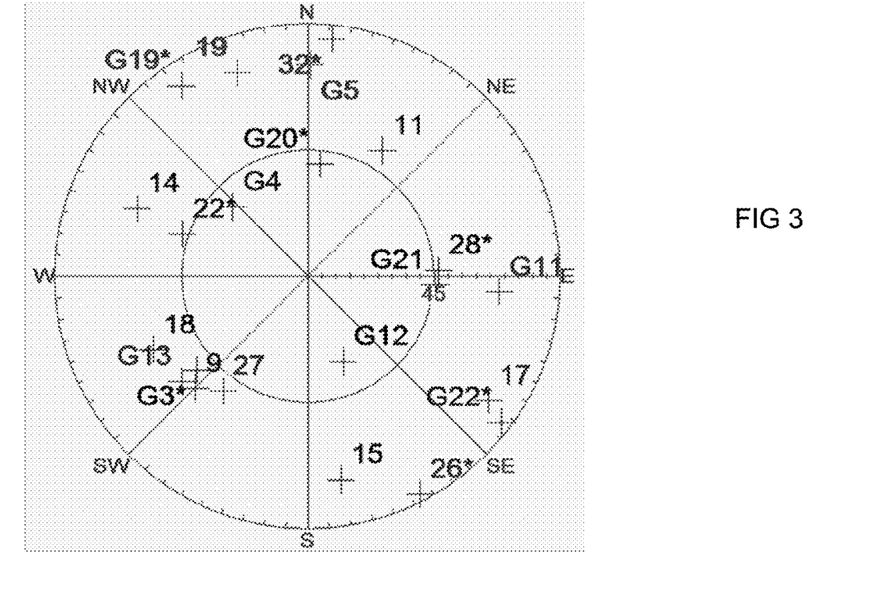
FIG. 3 illustrates an example of GNSS satellite positions as viewed from polar latitude.
Figure 4:
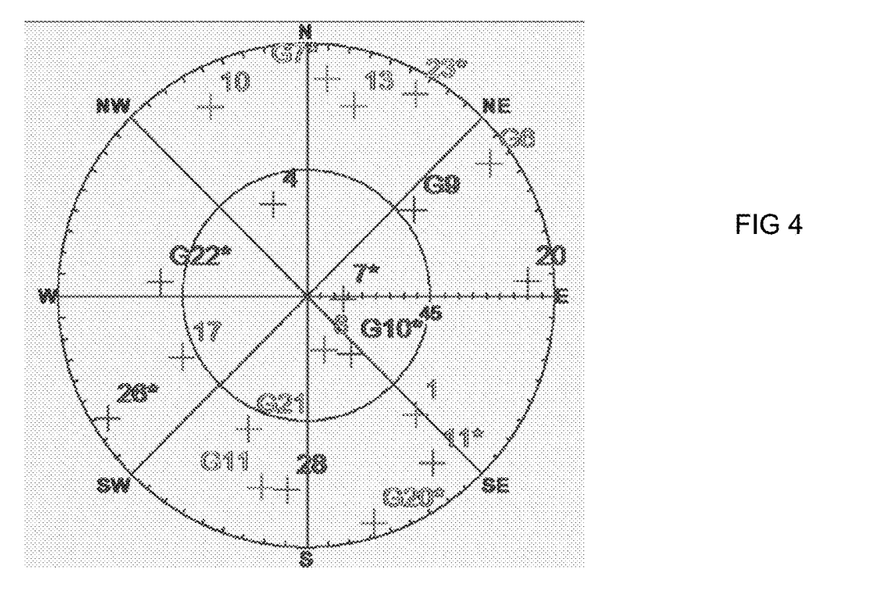
FIG. 4 illustrates an example of GNSS satellite positions as viewed from a equatorial latitude.

The clustering of satellites in the sky depends on the latitude of the receiver and, for regional systems, on its longitude as well. For instance, FIG. 1 illustrates satellite paths observed by a receiver at the equator. FIG. 3 illustrates satellite positions observed from the north pole. In the top right corner of the diagram, it illustrates four satellites in a cluster, within a circle, that might all fall in the same zone. The technology disclosed supports testing of devices as if they were at a wide range of latitudes and longitudes.

The characteristics of alternative satellite constellations can be simulated. For instance, GLONASS and Galileo constellations tend to have satellites in view for longer than GPS. China is deploying Compass. Japan's QZSS and India's IRNSS have deployed regional systems, which use geosynchronous satellites. QZSS is particularly innovative, staying at the zenith for a long time, with a FIG. 8 ground track.

Commercially available signal generators also can cover WAAS, EGNOS and MSAS augmentation systems in the L1 space. WAAS is a North American system that provides GPS correction data from ground reference stations. EGNOS is a European system and MSAS Japanese. Interference with signals in these bands can be simulated.

Cellular and WiFi augmentation also can be combined with the technology described. Cellular augmentation uses information from cell towers. WiFi augmentation uses information from WiFi access points. Interference with signals in these bands can be simulated.

Augmentation information can be provided over the air via cellular or WiFi connection or by wired/coax connection to a port on the device under test.

Generator Characteristics

In one implementation, a generator would simulate up to 4, 6 or 8 satellite sources for each of the constellations it supports. Existing commercial generators designed for coaxial testing from a single RF port can be adapted to drive directional antennas. A generator that supports six satellites for each of three constellations would mix up to 18 satellite signals for broadcast on a single antenna. Commercial simulator generators can support multiple constellations, such as GPS, GLONASS, Galileo, Compass, QZSS and satellite-based augmentation systems such as WAAS, EGNOS and MSAS in a single unit. Generators also can support multi-frequency satellite channels.

The suggested number of 12 generators (which can be more or less as required) would then provide 48 to 96 satellite capacity for each constellation, distributed across an in-view hemisphere. Part of this capacity can be devoted to generating multipath signals. Since typically less than 12 satellites are in view when a 10 degree elevation mask angle is applied, then only 0, 1 or 2 satellites from any constellation will typically appear in any particular zone. However, there will be situations when up to 4 or more could be present, depending on the zone size and elevation mask. An example here would be a polar location scenario for a 32 satellite GPS constellation where satellite arrival vectors are concentrated at low elevations, as illustrated in FIG. 3.

The use of a higher power level RF output port deals with transmission losses associated with several meters of free-space between the device under test and the transmit antennas.

Application of the Technology Disclosed

In a large chamber you can locate the generators close to the antenna, removing the need for RF cable runs. This involves cabling to support delivery of synchronization and control interfaces, such as 1 PPS and 10 MHz references, USB and main power. It is also possible to distribute the computing element of the simulator by co-locating a separate computer at each generator and providing a simple remote controller and coordination function over a standard network such as Ethernet. This would replace the single computer shown in FIG. 2.

The solution offers the ability to readily simulate groups (up to 4 nominally) of each constellation supported within the same segment of sky, resulting in an ability to simulate all-in-view with no extra RF hardware.

The granularity of arrival vectors presents a compromise, when compared to what could theoretically be achieved by moving antennas continuously in three dimensional space in real time. However, use of zones is not considered a significant drawback since antennas on tracks are impractical and more zones and generators could be added to improve the fidelity of signal angle of arrival, as desired.

Scenario duration is not constrained by issues related to rising or setting satellites.

Where the controlling and modeling software suite for the commercial generators supports assistance data to the device-under-test using an appropriate communications path, wired or wireless, then features such as A-GPS and A-GLONASS may also be applied.

In-Chamber DUT Manipulation

Tests often include changing the test orientation of the receiver or other device under test (DUT). For instance, a smart phone may be viewed by a user at arms length part of the time and placed next to the ear at other times. This involves at least rotation on two axes and translation of the device orientation and position. It also changes the relationship between the DUT and a phantom mass such as a user's head.

Manipulating a phone within the test chamber described is different than in a large chamber with one or a few antennas. Consider a chamber with a volume of about four cubic meters and a dozen antennas. In this small space, a movement of three feet would substantially change the position of the DUT relative to the antennas. Given the short distances involved and the squared distance law, the received power from some antennas would greatly increase and from others it would greatly decrease. In addition, the angle of arrival for signals would change, because the antennas are nearby instead of being virtually at infinity, as is the case for satellites.

Applying the technology disclosed, relative power can be manipulated within the chamber to compensate for changing the position of the DUT relative to the antennas. Movement can be programmed and the position of the DUT antenna within the chamber tracked. Antenna power can be boosted or attenuated as the DUT moves closer to or further away from an antenna. This can be done in software and hardware.

To keep both relative power and angle of arrival consistent during a test, the antenna of the DUT can to be kept near the center of the chamber. By near the center, we mean within $1/10^{th}$ of the radius or a minimum width of the chamber or even within $1/20^{th}$ of the radius or minimum width. Small variations in position can readily be compensated by variation of power. Small variations in position are likely to be within the resolution of the zone system of varying directions of arrival.

A phantom object such as a simulated user head also can be placed in the chamber and positioned relative to the DUT.

GLOSSARY OF TERMS

RF Radio Frequency, measured in MHz or GHz.

OTA Over-The-Air, connected via radio antennas for transmit and receive rather than via a wire or coaxial cable.

GNSS Global Navigation Satellite System, such as GPS (Global Positioning System—US) or GLONASS (Russia). Provides the ability to accurately locate a user or vehicle using coherent radio signals transmitted from orbiting satellites. In this disclosure and the claims, GNSS also refers to regional navigation satellite systems, for the sake of brevity and inclusiveness.

Some Particular Embodiments

In general, one aspect of the technology described can be embodied in methods implementing actions of simulating movement of multiple GNSS or regional navigational satellite system satellites across the sky within a test environment, including: providing a test chamber with a plurality of zones bounded by azimuth and elevation limits and positioning directional antennas in the test chamber with at least one antenna per active zone; driving the antennas individually with output from one or more GNSS simulators capable of producing multiple positioning signals for a plurality of satellite sources in a single zone; and coordinating among the GNSS simulators a simulated orbital movement of the satellite sources from one zone to an adjoining zone to produce changing angles of arrival for the positioning signals. Other embodiments of this aspect include corresponding systems, apparatus, and computer program products.

These and other embodiments can optionally include one or more of the following features. The plurality of zones may include 12 or 16 zones or in the range of 12 to 16 zones. For carrier phase sensitive equipment and for high resolution testing, it may include 24 or 32 zones or in the range of 24 to 32 zones. A dead zone may be defined, in addition to the plurality of zones, from an elevation of about 0 to 5 degrees or 0 to 10 degrees above the horizon and signals from satellites within the dead zone are not generated.

As another feature, the method may further include sending at least one reference timing signal to the GNSS simulators. It may further include sending at least a 10 MHz reference timing signal and a one pulse per second reference signal to the GNSS simulators. It also may include controlling the operation of the GNSS simulators from a controller coupled in communication with the GNSS simulators. Further, it may include supplying simulated GNSS signal correction signals into the chamber. It may include supplying simulated cellular or WiFi position signals into the chamber.

The optional features may include modifying orientation of a device under test positioned within the chamber while simulating the orbital movement of the satellite sources. Practicing this feature, an antenna of the device under test may remain within 1/10th of a radius of a center of the chamber as the orientation is modified. As the orientation and/or position of the device under test is modified, the power applied to the antennas in the chamber also may be modified to compensate for a changing position of an antenna of the device relative to a center of the chamber. Other embodiments of these optional features which may generally be combined with one another in a wide variety of features sets include corresponding systems, apparatus, and computer program products.

Particular embodiments of the technology disclosed can be implemented to realize one or more of the following advantages described above.

I claim as follows:

1. A method of simulating angular movement of multiple GNSS or regional navigational satellite system satellites across a sky within a test environment, including:
   providing a test chamber with a plurality of zones bounded by azimuth and elevation limits with directional antennas positioned in the test chamber with at least one antenna per active zone;
   driving the antennas individually with output from one or more GNSS simulators capable of producing multiple positioning signals for a plurality of satellite sources in a single zone; and
   coordinating among the GNSS simulators a simulated orbital movement of the satellite sources from one zone to an adjoining zone to produce changing angles of arrival for the positioning signals.

2. The method of claim 1, wherein the plurality of zones includes 12 to 16 zones.

3. The method of claim 1, wherein the plurality of zones includes 20 to 32 zones.

4. The method of claim 1, wherein a dead zone is defined, in addition to the plurality of zones, from an elevation of 0 to 10 degrees to a horizon and signals from satellites within the dead zone are not generated.

5. The method of claim 1, further including sending at least one reference timing signal to the GNSS simulators.

6. The method of claim 1, further including sending at least a 10 MHz reference timing signal and a one pulse per second reference signal to the GNSS simulators.

7. The method of claim 1, further including controlling operation of the GNSS simulators from a controller coupled in communication with the GNSS simulators.

8. The method of claim 1, further including supplying simulated GNSS signal correction signals into the chamber.

9. The method of claim 1, further including supplying simulated cellular or WiFi position signals into the chamber.

10. The method of claim 1, further including modifying orientation of a device under test positioned within the chamber while simulating the orbital movement of the satellite sources.

11. The method of claim 10, wherein an antenna of the device under test remains within 1/10th of a radius of a center of the chamber as the orientation is modified.

12. The method of claim 10, further including modifying power applied to the antennas in the chamber to compensate for a changing position of an antenna of the device relative to a center of the chamber.

13. The method of claim 1, further including driving one or more of the antennas with signals that simulate multipathing conditions.

14. A system that simulates angular movement of multiple GNSS or regional navigational satellite system satellites across a sky within a test environment, including:
   a test chamber;
   a plurality of zones defined in the test chamber, the zones bounded by azimuth and elevation limits;
   directional antennas positioned in the test chamber with at least one antenna per active zone;
   one or more GNSS simulators producing multiple positioning signals for a plurality of satellite sources in a single zone; and
   at least one controller coupled to the GNSS simulators that causes the GNSS simulators to simulate orbital movement of the satellite sources from one zone to an adjoining zone, thereby producing changing angles of arrival for the positioning signals.

15. The system of claim 14, wherein the plurality of zones includes 12 to 16 zones.

16. The system of claim 14, wherein the plurality of zones includes 20 to 32 zones.

17. The system of claim 15, wherein a dead zone is defined, in addition to the plurality of zones, from an elevation of 0 to 10 degrees to a horizon and signals from satellites within the dead zone are not generated.

18. The system of claim 14, further including a reference generator configured to send at least one reference timing signal to the GNSS simulators.

19. The system of claim 14, including a reference generator configured to send at least a 10 MHz reference timing signal and a one pulse per second reference signal to the GNSS simulators.

20. The system of claim 14, wherein the GNSS simulators further supply simulated GNSS signal correction signals into the chamber.

21. The system of claim 14, further including an augmentation signal generator further configured to supply simulated cellular or WiFi position signals into the chamber.

22. The system of claim 14, wherein the controller further causes the GNSS simulators to generating signals that simulate multipathing conditions.

* * * * *